United States Patent [19]

Delay

[11] 3,787,752

[45] Jan. 22, 1974

[54] INTENSITY CONTROL FOR LIGHT-EMITTING DIODE DISPLAY

[75] Inventor: Dennis G. Delay, Oxnard, Calif.

[73] Assignee: The United States of America as represented by the Secretary of the Navy, Washington, D.C.

[22] Filed: July 28, 1972

[21] Appl. No.: 276,017

[52] U.S. Cl. ......... 315/169 R, 307/311, 313/108 D, 340/336

[51] Int. Cl. ........................................... H03k 19/14

[58] Field of Search ............315/84.5, 84.6, 169 R, 315/169 TV; 313/108 D; 340/336; 307/228, 311

[56] References Cited

UNITED STATES PATENTS

| | | | |
|---|---|---|---|
| 3,691,390 | 9/1972 | Chow et al. | 313/108 D |
| 3,486,067 | 12/1969 | Griffith et al. | 315/84.5 X |
| 3,714,470 | 1/1973 | Goldberg | 307/228 X |
| 3,202,868 | 8/1965 | Blank | 315/169 R |

*Primary Examiner*—Herman Karl Saalbach
*Assistant Examiner*—James B. Mullins
*Attorney, Agent, or Firm*—R. S. Sciascia; Henry Hansen; H. E. Braddock

[57] ABSTRACT

A plurality of light-emitting diode elements which are unmatched in light output at the lower portions of their forward current ranges and which form an integrated illuminated visual display are activated by a power supply arrangement which applies to each diode element a series of independent power pulses of sufficient power to activate each diode element to saturation and into light-emitting condition in a frequency range which appears to the human eye to be steady illumination, the power supply arrangement being provided with a control feature for selectively varying the duration of the power pulses in order to vary the apparent intensity of the illuminated display, and also provided with current limiting means to limit the current passed by each diode element, during each power pulse and its activation thereby, to a given upper range of forward current in which the light-emitting diode element light outputs are substantially matched and in which optimum light emission efficiency is achieved.

6 Claims, 8 Drawing Figures

INTENSITY CONTROL FOR LIGHT-EMITTING DIODE DISPLAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to the field of selective intensity control systems for illuminated electrical displays, and more specifically to an improved intensity control arrangement for uniformly controlling the apparent intensity of a plurality of light-emitting diode elements forming a visual display in an airborne instrument system by the use of a duration-modulated power pulse system.

Duration-modulated pulses have been used generally in the known prior art to drive light-emitting gas discharge tubes, such as nixie tubes. The use of light-emitting diodes to form visual displays generally is known in the prior art. However these prior art arrangements apparently have not recognized the problems in specifically applying light-emitting diodes to illuminated visual displays requiring high efficiency and effective precise controls such as those used in high speed aircraft especially those intended for military use. It has been determined to be difficult and costly to produce light-emitting diodes which are closely matched over the entire range of their forward operating current. In addition it has been found necessary to drive these diodes essentially to the saturation point to achieve the desired illumination. In aircraft installation, space, weight, and available power are at a premium and build-up of undesirable amounts of generated heat by electrical units must be minimized. It can be seen that successful application of alight-emitting diodes with their desirable illuminating capabilities to airborne displays requires careful design to solve the related special technical problems involved. The prior art does not appear to have identified these problems, or provided variable intensity instrument display systems which could satisfactorily cope with them, or utilize the desirable features of recent light-emitting diode technology.

SUMMARY OF THE INVENTION

The shortcomings of the prior art visual display systems have been overcome and the hereinafter-mentioned objects of the invention have been achieved by the improved intensity control system for airborne display instruments making most effective use of the desirable light-emitting diodes. This system is an improved solid state system for achieving uniform intensity control of an illuminated visual display formed by a plurality of light-emitting diode elements which are unmatched in light output over the lower portions of their forward current ranges and matched at a given upper portion of their forward current ranges, said system comprising in combination: a plurality of light-emitting diode elements arranged in a visual display arrangement, said elements being unmatched in light output over the lower portions of their forward current ranges and matched at a given upper portion of their forward current ranges; a power supply means operatively connected to activate the diode elements to a light-emitting state by generating and applying to each of said diode elements a continuous series of independent electrical power pulses at a frequency above which said diode elements when activated appear to the human eye to be continuously illuminated, each of said pulses being of variable duration and of more than sufficient power to activate said diode elements in their given upper portions of their forward current ranges, said power supply means further comprising control means for selectively varying the duration of the power pulses to vary the apparent intensity of the visual display arrangement formed by said diode elements, said system further comprising; forward current limiting means cooperating with said diode elements and said power supply means to limit forward current through the diode elements on each power pulse to a predetermined given upper portion of their forward current range in which the light outputs of the light-emitting diode elements are substantially evenly matched.

STATEMENT OF THE OBJECTS OF THE INVENTION

It is an object of the invention to provide a novel improved intensity control system for illuminated visual displays of special advantage for aircraft applications, a system which overcomes the deficiencies of the prior art systems and takes advantage of the highly desirable properties of light-emitting diode technology to improve control, uniformity of illumination, and effectiveness, reduce size, weight, power consumption and cost, and provide such a system which is simple in construction, easy to fabricate, operate, and service, yet rugged and reliable in operation for long periods of operating life.

Other objects and advantages will become apparent from a consideration of the following specification, the claims, and the accompanying drawings, in which:

DESCRIPTION OF THE PREFERRED EMBODIMENT

Figures 1, 8:
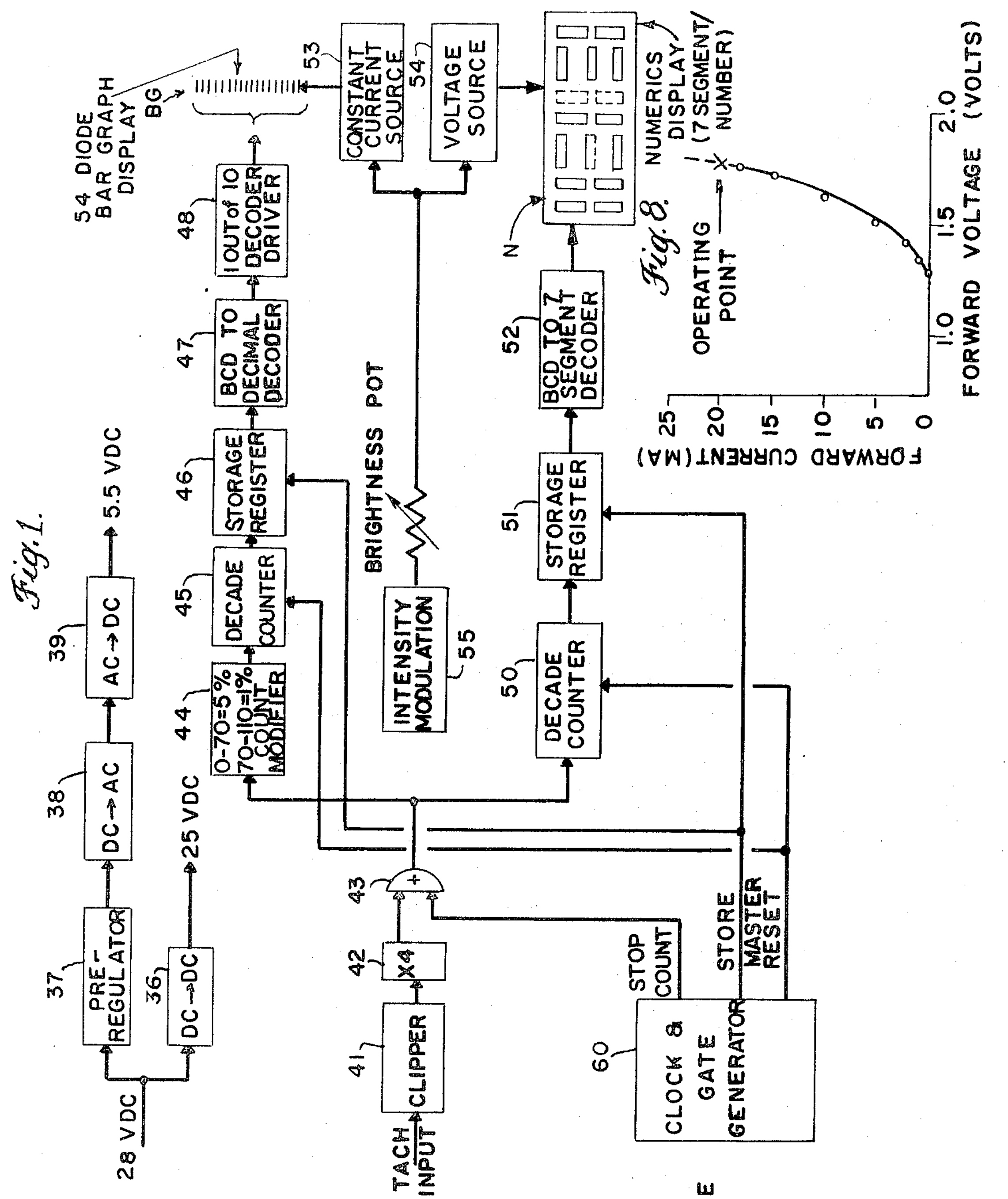
FIG. 1 is a general schematic or functional block diagram of an aircraft engine RPM counting and indicating instrument system with a selective illumination intensity control arrangement embodying features of this invention.
FIG. 8 is a graphical presentation showing the typical relationship of forward current to forward voltage for the light-emitting diodes preferably used in the system of the invention.

As shown in FIG. 1 a tachometer or instrument system with the intensity control feature of the invention comprises a display face assembly DF cooperating with an intermediate housing IH and a rear housing RH. The housings generally contain the power supply and circuitry components needed to activate the information display of the display face assembly. The information display for a two-engine aircraft consists of a vertical bar graph presentation BG for each engine and a corresponding numeric readout or presentation N appearing in a window 3 in housing 2 of the display face assembly.

Engine RPM of the left and right engines is presented in increments of five percent (from 0 to 70 percent of rates RPM) and one percent (from 70 to 110 percent of rates RPM) on the bar graph presentations or displays. Each bar graph display comprises 54 light-emitting diodes, indicated as LED in the drawings. Each diode is preferably sized at about 0.020 inches by 0.030 inches and will be described in greater detail hereinafter. Each numeric display is made up of two seven-segment numeric indicators and a single two-segment numeric indicator as shown in FIG. 1. The seven-segment numeric indicators are configured in a window frame format as shown from 14 light-emitting diodes (0.35 inches by 0.015 inches each) with two diode elements per segment. The numeric display reads out percent of rated engine RPM in one percent steps over the full range of the system to provide the pilot or viewer with a precision RPM reading at any desired time.

Figure 7:
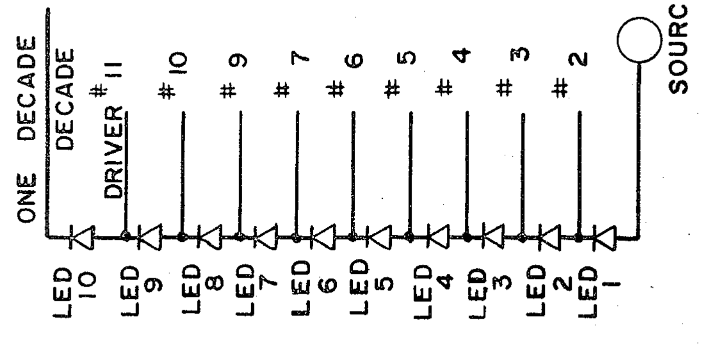
FIG. 7 is an illustrative showing of the preferred way in which the light-emitting diodes for one decade of the linear bar graph display are electrically connected between the power supply means with its intensity control features and the encoder means drive or switching arrangement for this display.

The diode elements of the bar graph display are configured in decades with each decade having its own constant current source and decade enable line (FIG. 7). The constant current sources provide uniform light intensity from all diode elements of this display.

The numeric display indicates the same data or information shown in the cooperating bar graph to provide redundancy and reliability. Generally, referring to FIG. 1, after the tachometer input signal is clipped, limited and multiplied by a factor of four, it is counted by the same type of decade counter as the bar graph display signal. At the end of each count period a store gate occurs and new count data is transferred to storage registers. From the storage registers the information is processed by BCD to seven-segment decoders which double as drivers to the light-emitting diode elements.

Intensity of the light-emitting diode displays is controlled by modulating the "on" currents of the diode elements by a variable pulse width generator. This variable duty cycle control gates the diode elements on and off at a non-flicker rate, the variable duty cycle gating appearing to the human eye as an intensity variation on the diode element emitted light. Since the diode elements are very rapidly driven to upper ranges of forward current on each power pulse, the various diode elements light emission need not be matched over the forward current operating curve but only at the predetermined upper range of this current. The diode elements are matched as to light emission only at this upper current range which simplifies their manufacture and lowers their cost. In addition, the "on" state is selected to involve that value or range of forward current where the light-emitting diode element efficiency is optimum. The intensity control circuit will be more fully described hereinafter.

Generally describing light-emitting diodes and their functioning, the direct conversion of electrical energy to light energy, or electroluminescence, is reasonably well known, having been first observed in semiconductors in about 1923 during work with silicon carbide detectors. The flow of current rhough the silicon carbide produced light without the crystal becoming incandescent, the color of the emitted light depending on the material and experimental conditions. This technology remained rather inactive until the 1950s when workers in the field applied theories developed for p-n junctions in transistors developed a theoretical explanation and renewed interest in the electroluminescent properties of semiconductors. Early light-emitting diodes radiated infrared and visible red color and more recently brightness and efficiency have improved to the point where they can be used to alert operating personnel even in well-lighted environments. The light emission is produced by injection and recombination of electrons and holes in the crystal material. As these excess carriers recombine, they give up energy in the form of photons.

Suitable efficient light-emitting diodes for use in systems embodying the present invention are fabricated from gallium aluminum arsenide using a solution growth technique. This method permits the formation of carefully-controlled p-n junctions by slowly cooling a solution of Ga, Al, and GaAs, where the Ga is in excess, and n or p type dopants (Te and Zn). Epitaxial layers of GaAlAs are deposited on a GaAs substrate as the solution cools from about 1000° C to about 880° C. Later, the substrate crystal is removed and the GaAlAs p-n junction that remains is provided with contacts using vapor-deposited metallurgy techniques. Through careful control of dopants and material concentrations, the emission wavelength of the diodes may be varied from about 6000 Angstroms (visible) to 9000 Angstroms (near IR).

Light-emitting diodes require reasonably high forward current densities before useful emission can occur. This current is generally greater than 10 amperes/cm$^2$. For a typical GaAlAs diode crystal of square 0.015 inch × 0.015 inch configuration, and assuming 20 milliamperes are required for a nominal value of 400 ft-lamberts, the current density J is about 14 amperes/cm$^2$. A forward voltage versus forward current curve for a typical GaAlAs light-emitting diode is shown in FIG. 8.

A summary of GaAlAs light-emitting diode characteristics is presented in Table I.

TABLE I

GaAlAs Light-emitting Diode Data

| | Min. | Max. | Units |
|---|---|---|---|
| Power Dissipation | | | |

| | | | |
|---|---|---|---|
| Derate Linearly from 25°C 2.5 mW per °C | | 150 | mw. |
| Forward Current, Continuous | | 100 | ma. |
| Peak Forward Current 1 us Pulse, 300 pulses per second | | 3 | amps |
| Operation Temperature | −55 | 100 | °C |
| Reverse Voltage at $I$=10μA | 3 | | volts |

Electro-Optical Operating Characteristics (25°C Unless Otherwise Specified)

| | Min. | Typical | Max. | Units |
|---|---|---|---|---|
| External Radiated Power $If$=50 mA | | 3 | | mw. |
| Peak Emission Wavelength | 6000 | | 9000 | A. |
| Emission Line Half Width | | 375 | | A. |
| Forward Voltage Drop at $If$=100 mA | | 1.8 | | volts |
| Forward Dynamic Resistance at $I$ f=100 mA | | 20 | | ohms |
| Reverse Current at $VR=3^V$ | | 1.0 | | ma. |
| Capacitance at $Vf$=0 | | 100 | | pf. |
| Capacitance at $Vf$=0.8V | | 150 | | pf. |
| Capacitance at $V_R$=3v | | 70 | | pf. |
| Light Turn-on Time | | 25 | | ns. |
| Light Turn-off Time | | 25 | | ns. |

Thermal Characteristics

| | Min. | Typical | Max. | Units |
|---|---|---|---|---|
| Wavelength Temperature Coefficient (Case Temperature) | | 1.3 | | A. per °C |
| Forward Voltage Temperature Coefficient Vf/T | | −1.5 | | mv. per °C |
| Output Attenuation Temperature Coefficient %/T | | .43 | | % per °C Ref. at 20°C |

More specifically the preferred diodes for use in the system of the invention are GaAlAs elements approximately 35 × 15 mils in size. A host crystal, serving as a substrate, of GaAs approximately 18 mils thick is the starting material. On top of this substrate a layer of N-type GaAlAs of approximately two mils thickness is grown. In turn, another layer of P-type GaAlAs is grown over the N-layer. Both the substrate and the P-layer are opaque while the N-layer is transparent with respect to the red light which is emitted when current is passed through the final p-n junction. The substrate is then lapped off leaving a p-n wafer approximately four mils thick. A layer of metal is then deposited on both sides of this wafer. The p-side is uniformly coated with gold/zinc, while the n-side is coated with gold/germanium/nickel through a mask which defines the N contacts. The whole wafer is then heated and the semiconductor-metal contacts are formed by the resulting alloying process. The metallized wafer is then cut up into discrete diode elements by a string saw. An etching process is then carried out to remove crystal damage caused by the sawing operation. Each diode element has a solid metal layer on the bottom or p-side and a metal contract on the n-side which will accommodate interconnecting wires. Each diode element is then bonded with a conductive epoxy compound to an anodized aluminum block. This block, which is machined to size is then anodized to provide an aluminum oxide insulation, and acts as a heat sink for the diode elements. The base of block is designed to maintain the diode element array at 40° C temperature when the ambient air is 25° C. The block is prepared with a black dye to eliminate reflective surfaces. One mil gold wires are used as flying leads to make the diode-diode and diode-terminal connections. In operation the display becomes visible, or illuminated as a result of the light generated within the p-n junction and passing through the top transparent N-layer. As seen in FIG. 8 the current-voltage characteristics of the light-emitting diodes used are similar to ordinary semiconductor diodes in shape. As voltage increases to about 1.8 volts the current change is somewhat gradual. However, at this point the current begins increasing very rapidly without appreciable voltage increase and will stress the diode/wire interface. As will become apparent in the following description a constant current source or series resistor in conjunction with a constant voltage source must be used to light or activate these diode elements. In the preferred system of the invention the constant current approach is used for the bar graph display and the series resistor is used for the numeric display.

Figures 2, 3:
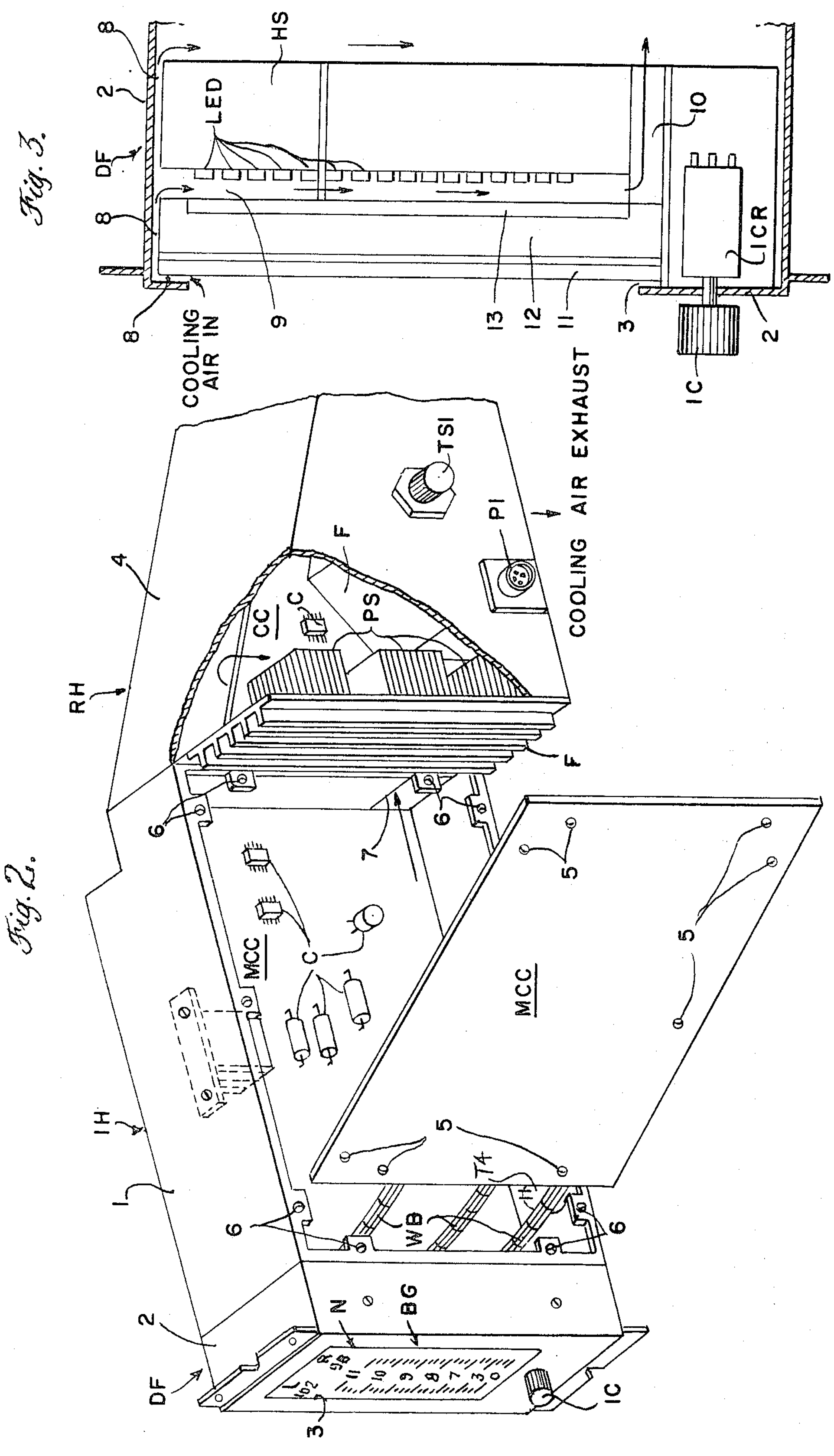
FIG. 2 is a partial perspective view of a basic two-engine aircraft tachometer unit with an intensity control system for the RPM display embodying principles of this invention. Certain parts are broken away and others shown partially disassembled for a clearer showing of features and their locations.
FIG. 3 is a partial vertical cross-sectional view through the front display face portion of the unit of FIG. 1 showing the general construction and arrangement of the visual display formed by the light-emitting diodes and the selective illumination intensity control element.

As shown in FIGS. 2 and 3, the display face assembly DF contains the light-emitting diode elements LED plus filter and other elements for visual enhancement of the overall display. Directly inside an opening 3 in the front of aluminum housing 2 of display face assembly DF is a cover glass 11 which has an HEA non-glare coating on both sides. Against this glass element is a plexiglas edge lighting insert element 12 which is provided with a plurality of incandescent lamps (not shown) to provide conventional illumination to engraved legends on red filter element 13. This filter element 13, visible from the front of the instrument is a clear circular polarized filter and a red filter sandwiched together. This filter over the black background of the heat sink member HS on which the light-emitting diodes LED are mounted provides maximum visual enhancement of the display. The diode element array on heat sink member HS is directly behind filter member 13. Diode elements LED are encapsulated beneath a layer of clear epoxy material to protect the diode elements, their leads, and interconnections. In addition the clear epoxy coating more effectively optically couples the diode element to the ambient air, giving an apparent brightness improvement of more than two over the unencapsulated condition.

The intermediate housing portion IH of the instrument comprises an aluminum framework member 1 to which is secured, by suitable conventional means, the display face assembly DF, its diode element heat sink member HS, two main printed circuit cards MCC, power converters and other elements (not shown).

The instrument has been designed for easy maintenance, the display face assembly DF, diode element array and heat sink HS being removable from the front, and the electronic circuit cards designed to swing out from the sides from operative positions in member 1, with conductor bundles WB acting as hinged connections, to lie flat on a work bench. Two rectangular cover plates having an inside coating of a glass-epoxy compound are secured by suitable means to the sides of framework member 1 to enclose printed circuit cards MCC in the intermediate housing. The glass-epoxy compound provides electrical insulation to prevent the printed circuit card conductors from shorting out against the housing. A durable conformal coating is applied to the component side of the circuit cards MCC to provide a good mechanical support between the components, wiring and the cards. Printed circuit cards are identical except for intensity control transistor Q7 for the bar graph.

Rear housing RH is enclosed by wall member 4 and contains electrical power supply units PS, printed circuit clock card CC and a fan for cooling air mounted in casing F. Wall member 4 also supports power supply connection PI and tachometer signal input connection TSI.

As shown by the arrows in FIGS. 2 and 3 the cooling fan in casing F brings in cooling air through the spaces 8 between glass panel 11 and front wall 2 of the display face assembly DF, moves the cooling air over the diode element array and heat sink HS, rearwardly through the intermediate housing IH and out through opening 7 into rear housing RH where it is passed over the power supply units PS for the light-emitting diodes and exhausted out the bottom of housing RH as shown through an exhaust opening not shown.

Clock card CC and power supply units PS can be reached for test and service by removing housing element 4. Power supply units are mounted on a wall portion of rear housing RH which wall portion is provided on its exterior surface with cooling fins FI for additional cooling affect.

Manually adjustable knob IC on the front of the display face assembly and the cooperating intensity control potentiometer ICR provide the means for selecting and adjusting the intensity of light produced by the light-emitting array.

Referring again to the general schematic showing of FIG. 1 it will be seen that the tachometer input is received by a clipper circuit 41 the output of which is connected through a multiplication-by-four circuit 42 to gate 43. The output of gate 43 is connected both to count modified circuit 44 and to decade counter 50. The output of count modified circuit 44 is connected to decade counter 45 which is in turn connected to storage register 46. Storage register 46 is connected to the input of BCD-to-decimal decoder 47 which is in turn connected to 1-out-of-10 decoder driver 48 which activates the selected light-emitting diode elements of bar graph display BG.

The output of decade counter 50 is connected to storage register 51 which is connected to BCD-to-seven-segment decoder 52 which activates the selected light-emitting diodes of numeric display N.

Intensity modulation unit 55 generates a series of independent power control pulses which are applied to the light-emitting diodes of the bar graph display BG via constant current source unit 53, and to the light-emitting diodes of the numeric display N via constant voltage (+ fixed resistance) source 54. Brightness pot 56 varies the bias applied to the output of a sawtooth oscillator circuit (not shown) to control the duration of the power control pulses and vary the apparent intensity of illumination for both displays BG and N.

Clock and gate generator circuit 60 is operatively connected in conventional fashion to gate 43 to control counting of tachometer input pulses for a precisely-measured predetermined interval. Clock and gate generator circuit 60 is also operatively connected conventionally to store registers 46 and 51 to enable them to store the count results of the decade counters 45 and 50, respectively, and further operatively connected to decade counters 45 and 50 to reset them to zero after count results have been stored in the storage registers 46 and 51.

Normal aircraft power at 28 volts DC is converted to more precisely controlled 25 volts DC and 5.5 volts DC used for the logic circuits and activation of the light-emitting diodes in a suitable arrangement of conventional units 36, 37, 38 and 39.

The tachometer input signal is a sine wave signal received from the aircraft engine tachometer and has a frequency proportional to engine RPM. In the preferred embodiment disclosed 100 percent of rated RPM equals 70 Hz. The input signal is clipped and limited by clipper circuit 41 and then multiplied by a factor of four in circuit unit 42 to provide 280 discrete pulses when the engine RPM = 100 percent rated. his signal passes gate 43 when enabled by a count signal from the clock and gate generator circuit 60 and is applied to two channels one including units 50, 51, and 52 associated with the numerics display N and the other including units 44, 45, 46, 47, and 48 associated with the bar graph display BG. Count modifier unit 44 is operated alternatively as a divide-by-five counter of a one-for-one straight-through counter. When the counter input pulses indicate an RPM of less than 70 percent rated RPM this circuit passes one pulse for each five it receives. When counter pulses exceed 70 percent rated RPM this circuit passes each pulse it receives. During the predetermined interval that gate 43 is enabled by the count signal from the clock and gate generating means 60 to pass tachometer input pulses the decade counter 45 and 50 are making the count of these pulses. At the end of this interval the enabling count signal to gate 43 is terminated, and the transmission of input pulses therethrough ceases. The clock and gate generator 60 next transmits a "store" signal to the storage registers 46 and 51 to enable them to receive and store the count results from the counters 45 and 50. The stored count result information in the storage registers 46 and 51 is simultaneously decoded by the respective decoder units and utilized to selectively cause energization of appropriate light-emitting diodes in each of the displays BG and N to indicate visually the stored count results. Following storage of count results and visual indication thereof, the clock and gate generator circuit provides a "reset" signal to each counter 45 and 50 to return the count to zero and again provides the "count" signal to enable gate 43 to again pass tachometer input signals to the counters for a succeeding interval and repetition of the counting and storage-display cycle.

Figures 4, 5, 6:
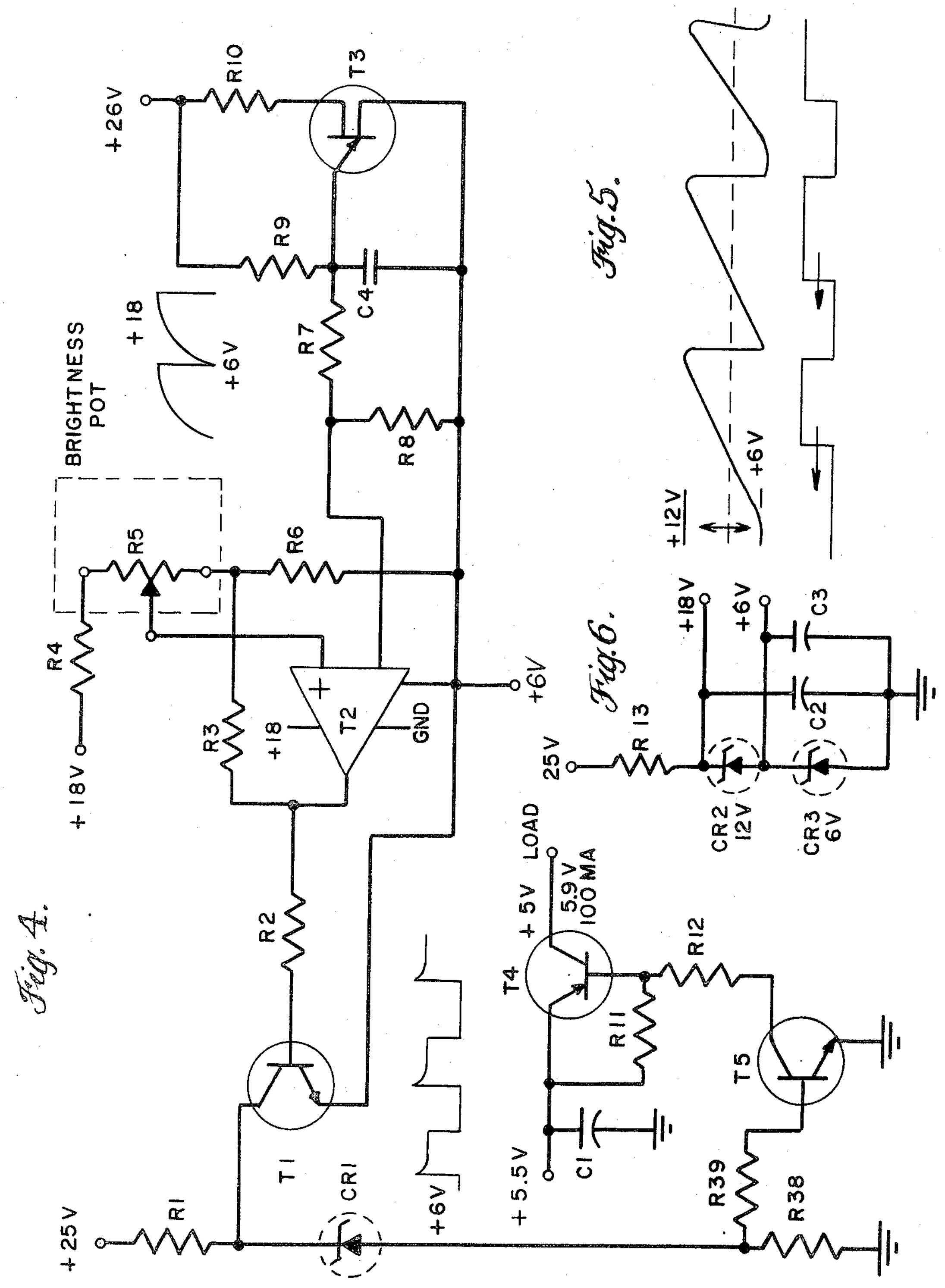
FIG. 4 is a circuit diagram of the electrical intensity control circuit of the invention.
FIG. 5 is a general graphical presentation illustrating the manner in which varying the DC reference voltage input to the comparator varies the sawtooth output bias level to control the duration of the output pulses from the comparator.
FIG. 6 is a circuit diagram of the zener supply circuit for the differential comparator of FIG. 5.

Referring to FIG. 4, the intensity control system or circuit embodying principles of the invention is shown, and provides to the light-emitting diodes a variable duty cycle power signal in the form of a series of independent square wave power pulses of variable duration thereby changing the apparent brightness of the diode display. The output of a sawtooth oscillator consisting of unijunction transistor T3, resistors R9 and R10, and capacitor C4 as shown in FIG. 4, is divided downwardly by resistors R7 and R8 and applied as one input to a differential comparator T2. The other input applied to comparator T2 is a DC voltage derived from the brightness or intensity control pot consisting of resistor R4, adjustable resistor R5, and resistor R6. Varying this DC voltage between +6V and +12V causes a variable pulse width output from comparator T2 which is positive whenever the sawtooth wave exceeds the DC levels and at ground level when it does not. A feedback resistor R3 is provided to smooth the overall operation of comparator T2. The output of comparator T2 is applied to base resistor R2 and the base of output transistor T1 to complete the variable duty cycle generator. This generator circuit is biased up +6V, so that the differential comparator which normally uses positive and negative voltages can operate from positive supply voltages only. The output of output transistor T1 is then biased back down to ground level and 6V by resistor R1 and Zener diode CR1. The final output stage of the power amplifier consists of transistor T4, resistors R11 and R12, and capacitor C1 and is the final driver stage for the display formed by the light-emitting diodes. Transistor T4 is located toward the front of the instrument package as shown in FIG. 2. A Zener power supply of +6V and +18V for differential comparator T2 is shown in FIG. 6 and consists of resistor R13, Zener diodes CR2 and CR3 and capacitors C2 and C3.

It is believed to be clear from the above description and discussion that applicant has provided an intensity control system for a light-emitting diode display which is a significant improvement over the prior art systems and achieves the objects of the invention.

Although a preferred embodiment has been described in detail in accordance with the Patent Law, many modifications and variations within the spirit of the invention will occur to those skilled in the art and all such are considered to fall within the scope of the following claims.

What is claimed is:

1. An improved solid state electrical instrument system for achieving uniform intensity of an illuminated visual display arrangement, comprising in combination:

a plurality of light-emitting diode elements arranged in the visual display arrangement, said elements being unmatched in light output over the lower portions of their forward current ranges and matched at a given upper portion of the forward current ranges;

a power supply means for generating a continuous series of independent electrical power pulses at a frequency above which said diode elements when activated appear to the human eye to be continuously illuminated, each of said pulses being of more than sufficient power to activate said diode elements in their given upper portions of their forward current ranges, and including control means for selectively varying the duration of the power pulses to vary the apparent intensity of the visual display arrangement formed by said diode elements; and forward current limiting means connected to receive said pulses for limiting the forward current through the diode elements on each power pulse to a predetermined given upper portion of their forward current range in which the light outputs of the light-emitting diode elements are substantially evenly matched.

2. The improved system of claim 1 wherein said forward current limiting means further comprises:

divider means receiving and biasing said pulses; and regulating means receiving said biased pulses and for regulating the current output of said pulse within the predetermined portion of the forward current range of said diode elements.

3. The improved system of claim 2 wherein said divider means comprises:

a regulated voltage source;

a first resistor connected at one terminal to the output of said power supply means; and a second resistor connected between said regulated voltage source and the other terminal of said first resistor.

4. The improved system of claim 3 wherein said regulating means comprises:

a transistor having an emitter connected to said regulated voltage source, a base connected to said other terminal of said first resistor, and a collector connected to said diode elements; and capacitor means connected between said regulated voltage source and ground.

5. The improved system of claim 4 wherein said power supply means further comprises:

a sawtooth oscillator circuit means for producing a sawtooth wave;

a differential comparator unit receiving the sawtooth wave and a selected DC reference voltage from said circuit means for producing an output pulse of regulated duration.

6. The improved system of claim 5 wherein said control means includes a selectively adjustable means for varying the level of the selected DC reference voltage to said comparator unit.

* * * * *